United States Patent Office 3,147,265
Patented Sept. 1, 1964

3,147,265
PHOSPHONIUM QUINOLINATES
Thomas Mason Melton, Richmond, Va., assignor to Socony Mobil Oil Company, Inc., a corporation of New York
No Drawing. Filed Dec. 19, 1962, Ser. No. 247,792
7 Claims. (Cl. 260—283)

This invention is concerned with compounds of the general formula

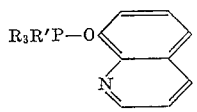

wherein R is a member of the group consisting of alkyl groups of from 1 to 4 carbon atoms and phenyl, and R' is a member of the group consisting of alkyl groups of from 1 to 4 carbon atoms, dodecenyl, alkyl-substituted benzyl, wherein the said alkyl group contains from 1 to 12 carbon atoms, and halo-substituted benzyl.

The new compounds of this invention are preferably obtained by reacting a phosphonium halide of the formula $$R_3R'PY$$

wherein R and R' have the same meaning as above and Y is halogen or hydroxyl, with hydroxyquinoline.

Methods of preparing the phosphonium halide starting materials are well-known in the art. For example, they may be prepared by the addition of a slight excess of an appropriate organic halide to a cold solution of an organic phosphine and inert solvent, heating to complete the reaction and subsequently removing solvent and excess halide.

The reaction from which the phosphonium quinolinates are obtained may be carried out in an inert organic solvent, using an organic amine as the halogen acid acceptor. The useful amines will include mono-, di- and trialkylamines such as mono-, di- and trimethylamine, mono-, di- and triethylamine, mono-, di- and triproplamine, and the like, saturated cyclic amines such as cyclohexylamine and the like, and aromatic amines such as pyridine. Among the more useful organic solvents are benzene, toluene and chlorobenzene. Others will be obvious to those skilled in the art.

Whereas the compounds of this invention may be prepared in the absence of acid acceptor or organic solvent (Example 1), or even in water alone as the solvent (Example 2), a preferred method of preparing them involves the use of an aqueous solution of an alkali metal hydroxide as the acid acceptor and an organic solvent such as one of those named above. In this method, the appropriate phosphonium halide, hydroquinoline and acid acceptor are placed together in an inert organic solvent and heated to drive the reaction to completion. Upon completion of the reaction, the solvent layer is separated from the mixture and the solvent removed under reduced pressure, leaving the phoshonium quinolinate.

The novel compounds of the present invention are useful as plant growth arresters, which term includes plant growth retardants and secondary growth inhibitors. To achieve the desired action on plants, the compounds may be applied per se or in the form of solutions, emulsions, dust formulations, pastes, and the like containing minor amounts of said compounds.

If the active component happens to be water soluble, water formulations may be prepared using water alone. To aid in a more uniform distribution, however, it will be expedient to add a small amount of an emulsifier, or surface-active agent, to the formulation. In such a case, while no all-inclusive rule as to the amount of surface-active agent required can be set forth, generally the amount will be below that at which the agent becomes phytotoxic to the plant being treated. Examples of useful emulsifiers are Tween 20 (polyoxyethylene corbitan monolaurate) and Atlox G–2081 (a mixture of 30% alkyl aryl sulfonates and 70% ployoxyethylene sorbitan esters of mixed fatty and resin acids).

A suitable surface-active agent is also used in the preparation of lanolin paste formulations. Lanolin pastes (containing about 25 mg. of active component for every 2 grams of lanolin) will usually have therein approximately 20% by weight, of the agent.

In preparing aqueous emulsions, the active component is preferably dissolved in acetone or other suitable volatile, non-phytotoxic solvent and mixed with a surface-agent. This mixture is then placed in water, the amount of water being regulated to give the desired concentration of active ingredient.

Dry formulations using, for example, Pyrax or Attaclay may be prepared by placing together the carrier and active ingredient in the desired proportions, mixing, and grinding to a prescribed size. For the best possible mixing, however, it is desirable that the active ingredient be dissolved in a volatile solvent such as acetone (usually containing about 10% of the compound) and added to the stirred solid. Upon evaporation of the solvent, a dry formulation containing a uniformly distributed active component is obtained. Among the other solid carriers which will be obvious to those in the art are vermiculite, talc, diatomite, bentonite, oat hulls, ground walnut shells, wood flour, Continental clay, and the like.

The above formulations may be applied by any conventional means. Plants may be sprayed directly with liquid formulations just to the point of liquid run-off. Dry formulations may be mixed with water before application or applied to plants in a manner usually employed therefor. Control may also be effected by applying the formulations, liquid or solid, to the soil in which plants are growing.

Whereas the total effective range of the compounds of this invention is not known, it is contemplated that they will be useful for the disclosed purpose when used within the preferred range of about 0.1% to about 1.25% of the weight of the formulation. It will be understood that under ideal conditions, less than 0.1% will be effective, while under adverse conditions of weather or plant resistance more than 1.25% may be necessary.

The following examples will specifically illustrate the compounds of this invention. It will be understood that they are not to limit the invention, the only limitation thereto being with respect to the scope of the appended claims. Parts are by weight.

Example 1

Five and five-tenths parts of tetrabutylphosphonium hydroxide and 2.65 parts of 8-hydroxyquinoline were mixed and stirred for 5 minutes. The liberated water was removed by vacuum distillation, the final temperature reaching 100° C. at a pressure of 30 mm. of mercury. The product, having the formula

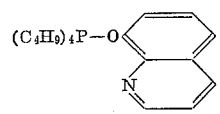

had the following properties:
Refractive index at 25° C.—1.5355
P (calc.)—7.69%; P (found)—7.11%

Example 2

Nineteen and nine-tenths parts of tributyl-2,4-dichlorobenzylphosphonium chloride, 7.3 parts of 8-hydroxyquinoline and 2.2 parts of sodium hydroxide were placed in 80 parts of water and the mixture was heated at 100° C. for 1 hour. The reaction mixture was cooled, and shaken with 44 parts of benzene. The benzene layer was separated, washed with 3–25 part portions of water, and then removed at 100° C. and 30 mm. of mercury.

The product

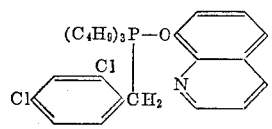

had the following properties:

Refractive index at 24° C.—1.5286
Density 20°/4°C.—1.088
P (calc.)—6.12%; P (found)—5.81%

Example 3

Ten and thirteen-hundredths parts of tributyldodecenylphosphonium chloride, 3.63 parts of 8-hydroxyquinoline, and 1 part of sodium hydroxide in 40 parts of water were placed in 44 parts of benzene and heated at 80° C. for 1 hour. The reaction mixture was cooled and the benzene layer was washed with 50 parts of water. The benzene was vacuum distilled to 100° C. and 30 mm. of mercury. The product

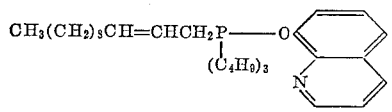

had the follow properties:
Refractive index at 26° C.—1.5280
P (calc.)—6.03%; P (found)—6.46%

Example 4

Twelve and four-tenths parts of tributyldodecylbenzylphosphonium chloride, 3.63 parts of 8-hydroxyquinoline, and 1 part of sodium hydroxide in 40 parts of water were placed in 44 parts of benzene and heated at 80° C. for 1 hour. The mixture was cooled, the benzene layer was washed with 50 parts of water, and then the benzene was vacuum distilled to 100° C. at 30 mm. of mercury, leaving a product of the formula

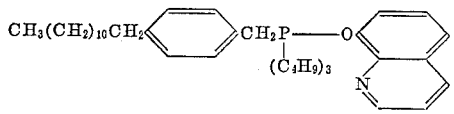

This product had the following properties:
Refractive index at 26° C. —1.5325
P (calc.)—5.21%; P (found)—5.23%

Example 5

Two and five-hundredths parts of dodecenyltriphenylphosphonium chloride, 0.73 part of 8-hydroxyquinoline, and 0.2 part of sodium hydroxide in 40 parts of water were treated as in Example 4. The product obtained was

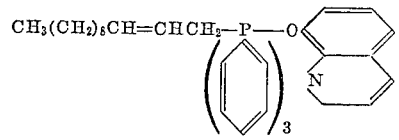

Example 6

Eleven and fourteen-hundredths parts of dodecylbenzyltriphenylphosphonium chloride, 2.0 parts of 8-hydroxyquinoline, and 0.8 part of sodium hydroxide in 40 parts of water were treated as in Example 4 to give a product of the formula

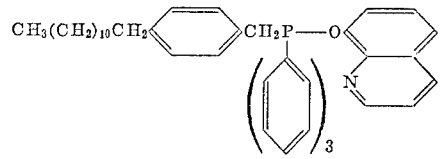

Example 1, it will be noted, uses the phosphonium hydroxide rather than the halide. The tetrabutylphosphonium hydroxide of that example was prepared from tetrabutylphosphonium bromide and an equimolar quantity of freshly prepared silver oxide.

Other compounds which may be prepared as above and which come within the scope of this invention are as follows:

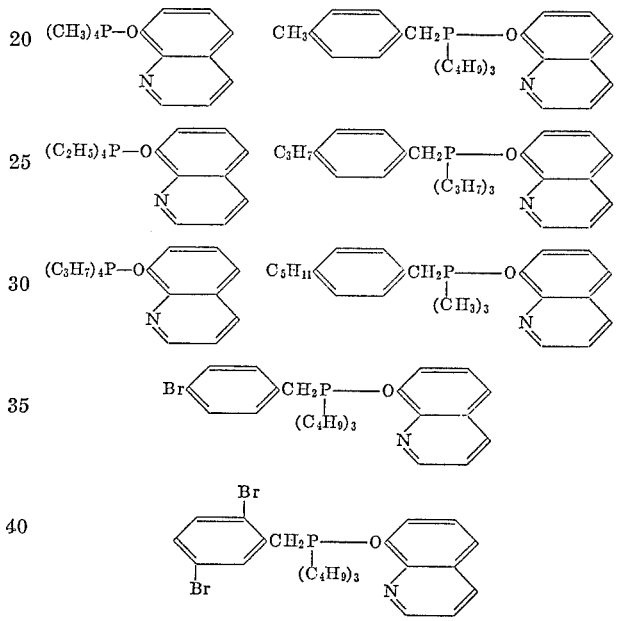

I claim:
1. The phosphonium quinolinates of the formula

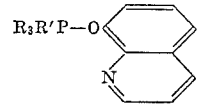

wherein R is a member of the group consisting of alkyl of from 1 to 4 carbon atoms, and phenyl, and R' is a member of the group consisting of alkyl of from 1 to 4 carbon atoms, dodecenyl, alkyl-substituted benzyl, wherein the said alkyl is an alkyl of from 1 to 12 carbon atoms, and halo-substituted benzyl.

6. 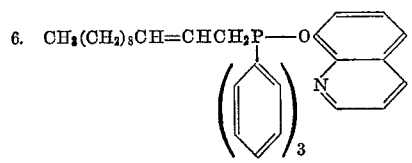
7. 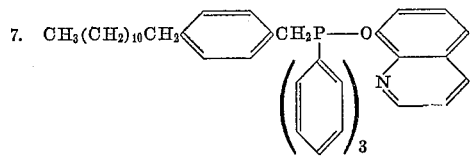
No references cited.